2,782,634

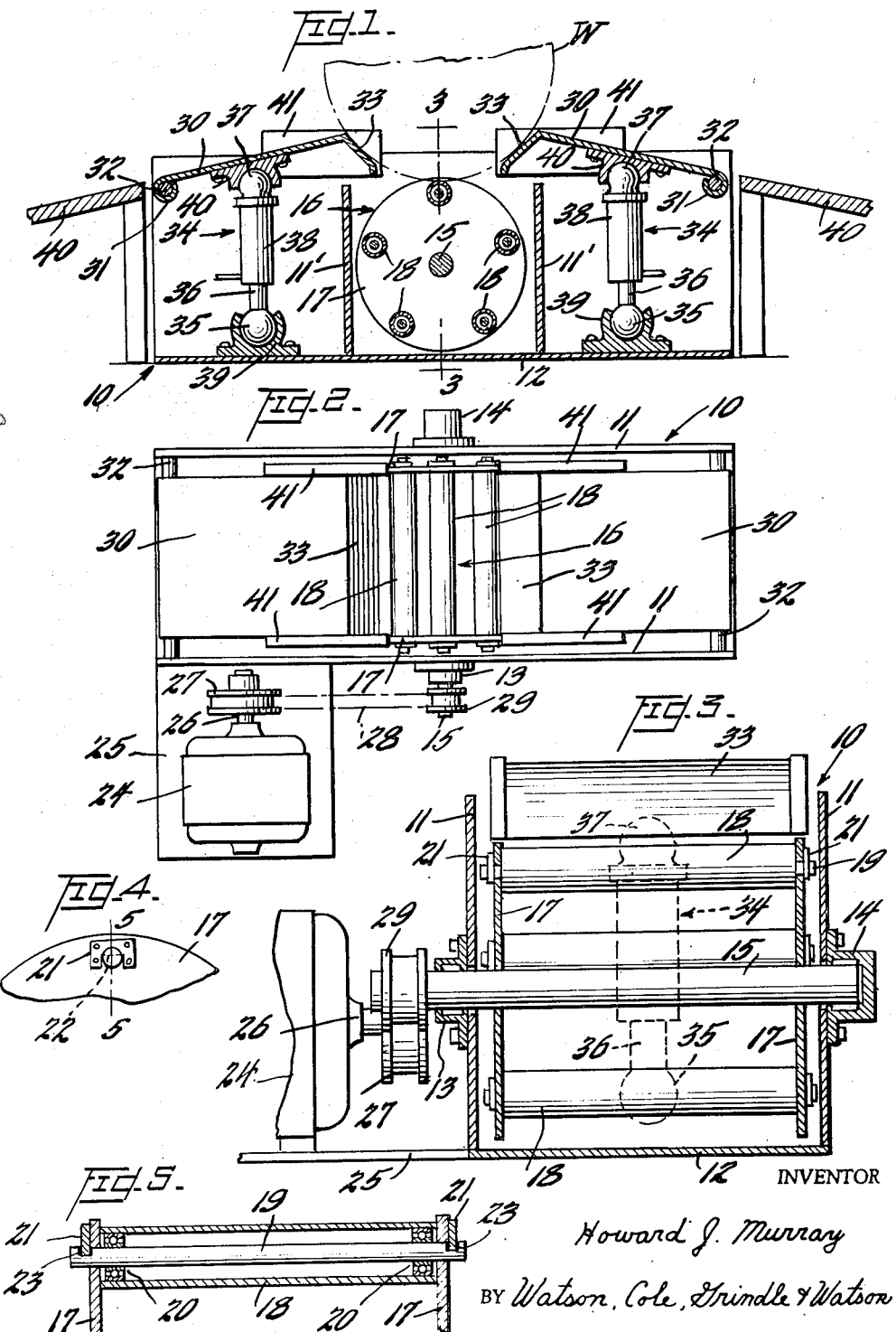
Feb. 26, 1957     H. J. MURRAY     2,782,634
AUTOMOBILE TESTING DEVICE
Filed Sept. 19, 1955
INVENTOR
Howard J. Murray
BY Watson, Cole, Grindle & Watson
ATTORNEYS

# United States Patent Office 2,782,634
Patented Feb. 26, 1957

AUTOMOBILE TESTING DEVICE

Howard J. Murray, Harrisburg, Pa.

Application September 19, 1955, Serial No. 534,916

3 Claims. (Cl. 73—71.7)

This invention relates to an automobile testing device of the type exemplified generally in Theodore H. Kirk U. S. Patent No. 2,697,346 of December 21, 1954.

In this type of device it is customary to position one or more of the automobile wheels so that it rests on and is supported by a rotating drum or rotor having peripheral protuberances or impact elements adapted to successively impact against the wheel and through it transmit to the car a series of shocks which may be made to simulate road shocks. Thus with the automobile stationary, while subjected to these simulated road shocks, it is possible for a mechanic to inspect its undercarriage quite closely to locate the sources of rattles, squeaks or various abnormal noises which might arise from wear, improper lubrication, malfunctioning of parts or the like.

While the prior art has provided for varying the rotational speed of the rotor, and thus the frequency of the impacts, to bring out noises, squeaks, etc. which occur only within certain frequency ranges, provision has been lacking for any means of also varying the degree or force of each impact. This latter type of variation has been found of substantial importance in producing and making possible the location of noises which might not be audibly produced by impacts of a given degree of force or violence.

With the foregoing in mind it is a primary object of this invention to provide an adjustable means for varying the intensity or violence of the impacts independently of any variations in the frequency of such impacts. To this end means is provided for vertically adjustably supporting the wheel of the automobile or other vehicle above the impact producing rotor, so that lowering of the wheel toward the rotor causes it to be engaged with increasing force by the impact elements of the rotor.

A still further feature consists in forming the impact elements of the rotor as freely rotatable rollers, which by rotating when in engagement with the tire of an automobile wheel, minimize any tendency of the rotor to rotate the wheel and displace it from the said adjustable means.

Other features of the invention consist in the novel arrangement of the several moving parts in a channel type base or frame, in such manner as to reinforce the base while effectively positioning the parts for efficient cooperation.

In the preferred embodiment of the invention illustrated in the accompanying drawing:

Figure 1 represents a longitudinal vertical section through a testing device in accordance with the invention, same being taken on the line 1—1 of Figure 2, and showing fragmentarily the ramps arranged to facilitate driving a car into operative position on the unit;

Figure 2, a plan view of the unit shown in Figure 1;

Figure 3, an enlarged section on the line 3—3 of Figure 1;

Figure 4, a fragmentary view of one end of the rotor, showing the preferred manner in which the impact producing rollers are mounted; and Figure 5, a section on the line 5—5 of Figure 4.

Referring now in detail to the drawings, the reference character 10 designates in its entirety, a base or housing of channeled metal construction embodying relative transversely spaced upstanding sides 11—11 interconnected at their lower edges by a horizontal bottom or base plate 12.

Disposed in base 10 medially between its respective sides 11 are conventional bearings 13, 14, preferably of the sealed type, which rotatably support shaft 15 of a rotor 16 adapted to impact against an automobile wheel W (Figure 1) during rotation of the rotor, to simulate road shock.

Rotor 16 is preferably in the form of a cylindrical cage comprising end discs 17—17 fixed on the shaft 15 in spaced relation and rotatably supporting between them a plurality of peripherally disposed impact elements 18, each of which, in the preferred form of the invention (and as shown in detail in Figure 5), comprises a tubular roller rotatably supported on a shaft 19 by means of usual bearings 20. Each of the several shafts 19 preferably has its opposite ends disposed and supported through conformingly shaped openings on the respective end discs 17, and secured against both axial and rotary movement by metal lock plates 21 secured as by screwing them to the outer faces of the respective discs. As is illustrated in Figure 4, each such lock plate may conveniently be formed of generally U configuration, and applied so that the two legs of the U straddle the shaft 19, while the bridge portion interconnecting these legs is formed with an inwardly directed rectilinear edge portion 22 to be received in a flat bottomed slot 23 (Figure 5) formed in the associated shaft 19.

The rotor 16 is adapted to receive rotation from any suitable source of power, such as the motor 24 fixed on the lateral extension 25 of base 10 on one side thereof. In the illustrated embodiment, this motor has fixed on its output shaft 26 a driven pulley 27 which transmits power through a belt 28 to a driven pulley 29 keyed on the end of rotor shaft 15 exteriorly of the base 10. Preferably the motor 24 is an electrical one of the variable speed type, whereby the frequencies of the impacts of elements 18 against the automobile wheel may be varied through a sufficient range to be in synchronism with such squeaks, noises and rattles as may occur in the automobile.

In order to position the automobile wheel securely over and in operative relation with the rotor 16 there are provided suitable wheel support means, exemplified by the wheel supports or elements 30—30 disposed in longitudinally spaced relation on opposite sides of and equidistant from the vertical axial plane of the rotor 16.

It is an important feature of the invention to provide for vertical movement and adjustability of the wheel support means 30—30 in order that such means may raise or lower the supported wheel with regard to the rotor 16 and thereby vary the violence or force of the impacts on the wheel. It will, of course, be understood that the impacts will actually be directed against the usual pneumatic tire of the wheel and will tend to indent same to a greater or lesser degree, thereby transmitting to the entire automobile a greater or lesser degree of simulated road shock.

To this end, each said support 30 comprises a metal plate which, at its end remote from the rotor is hinged as at 31 for vertical swinging movement about a cross shaft 32 fixedly supported between the sides 11—11 of the base. In addition to providing hinged mountings for the wheel supports 30, these shafts 32 obviously serve as tie rods, rigidly interconnecting and reinforcing the base sides 11 against relative lateral deflection. If desired, the sides 11—11 may be further interconnected and reinforced by upstanding transverse webs 11'.

Chock members 33 fixed on the respective plates 30 and forming part of the wheel supports present relatively opposed downwardly converging faces 33 disposed to jointly support an automobile wheel W above the rotor 16, as indicated in Figure 1, in such manner that these members prevent longitudinal displacement of the wheel, while exposing the lower peripheral portion of the wheel for impacting engagement by rotor 16.

Actuation of these wheel supports 30 to raise or lower the wheel W may be accomplished through extensible means such as the hydraulic jacks 34 or other extensible elements pivotally connected between each wheel support and the bottom base plate 12. The construction and mode of operation of these jacks, being purely conventional, are not illustrated or described in detail.

In addition to maintaining the wheel supports in various positions of vertical adjustment, the jacks 34 may be rapidly raised and lowered simultaneously, thereby acting through the automobile wheel to rock the car for the purpose of bringing out any noises not made evident by the rotor action alone. Such rocking may occur either with the rotor stationary or while it is rotating to coact with the tire of the wheel in its intended manner.

For the purpose of cushioning any rattles in this pivotal connection at the opposite ends of the respective jacks 34, each such jack may be provided with a rubber cushion or ball 35 vulcanized onto the free end of its piston rod portion 36, and a similar cushion or ball 37 vulcanized or otherwise fixed to the free end of its cylinder 38. These both may be received in metal sockets 39 and 40 respectively fixed to the horizontal base plate 12 and to the under face of each support 30.

In the use of the invention, a pair of the units shown in Figure 1 may be disposed abreast of each other, preferably with the motors 24 and drive belts 28 on the relatively remote sides of these units, so that a mechanic may position himself beneath the automobile between these units, to safely inspect the undercarriage as the units are operated.

Inclined ramps 40, placed in alignment with the respective units, provide a means for running the wheels of the automobile up onto the wheel supports 30, and these supports 30 will serve automatically through the chock surfaces 33 to properly position the automobile wheels W above the respective rotors 16. Thereupon the operator may operate either or both of the rotors 16, varying the speed of each through control of its variable speed motor 24, to produce a series of impacts against the wheel at various frequencies.

The intensity or magnitude of such impacts may be varied by actuating the jacks 34 of each unit simultaneously to raise or lower its associated automobile wheel.

Obviously when the rotors 16 are made to embody freely rotating impact rollers or elements 18, as in the preferred embodiment, it will be unnecessary to provide any special means for restraining the wheels from rotation, such as might injure a mechanic beneath the car or cause them to climb out of the restraining chock surfaces 33—33. The rotational force exerted on the wheels is, in fact, so slight that the wheels may be easily manually restrained against rotation, when the chocks do not engage them sufficiently to prevent rotation.

If desired, guide plates 41 may be fixed on the opposite sides of the respective supports 30 to laterally position the wheel W on the supports 30 in a manner whereby its tire will avoid contact with the rotor end discs 17.

In this application there is shown and described only the preferred embodiment simply by way of illustrating the preferred mode of carrying out the invention. However, it is realized that this invention and its several details may be modified in various additional ways, without departing from the scope of the appended claims. Accordingly, the drawings and description herein are to be construed as merely illustrative in nature and not as exclusive.

Having thus described my invention, I claim:

1. In an automobile testing device the combination of a base, a rotor supported by said base for rotation about a horinzontal axis, a series of impact rollers carried by said rotor for free rotation around axes concentric and parallel to said horizontal axis, and means for positioning a wheel of a vehicle on said rotor for successive engagement by the respective rollers as the rotor is rotated, the ensuing rotation of said rollers in engagement with the wheel tending to minimize the rotational forces imparted to the wheel.

2. Road testing apparatus for vehicles comprising an upwardly opening hollow base, a rotor journalled for rotation about a fixed horizontal axis within said base, said rotor comprising a plurality of rollers journalled thereon for free rotation about axes parallel and concentric to said fixed horizontal axis, a pair of relatively spaced wheel supports respectively carried by said base on opposite sides of the vertical axial plane of said rotor axis, for supporting a vehicle wheel for impact engagement by the successive rollers of said rotor, said supports being pivotally connected to said base at their relatively remote portions for vertical swinging movement, and extensible jack means interconnecting each said support with said base for raising and lowering the relatively adjacent portions of said supports to vary the vertical position of the vehicle wheel rotation to the rotor.

3. An automobile testing device comprising a stationary base of channel cross-section having relatively spaced upstanding sides interconnected by a horizontal bottom plate, a rotor shaft rotatably supported between and transversely to said sides, a rotor fixed on said shaft, including a plurality of peripherally disposed impact elements thereon, cross shafts respectively supported between and bracing said sides on opposite sides of said rotor, a wheel support pivoted on each cross shaft for vertical swinging movement and normally projecting in a generally horizontal direction toward said rotor, and extensible jack means beneath the respective wheel supports interconnected between each said wheel support and said bottom plate for vertically swinging the respective wheel supports to desired positions of adjustment.

References Cited in the file of this patent

UNITED STATES PATENTS

| | | |
|---|---|---|
| 2,697,346 | Kirk | Dec. 21, 1954 |
| 2,709,361 | Marcus | May 31, 1955 |